US 6,529,350 B1

(12) United States Patent
Itoh

(10) Patent No.: US 6,529,350 B1
(45) Date of Patent: Mar. 4, 2003

(54) HEAD ASSEMBLY AND SUSPENSION HAVING A TERMINAL SECTION WITH A BEND FOR CONTACT

(75) Inventor: Takashi Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/547,303

(22) Filed: Apr. 11, 2000

(30) Foreign Application Priority Data

Sep. 16, 1999 (JP) .............................. 11-262048

(51) Int. Cl.⁷ ................ G11B 5/48; G11B 5/40
(52) U.S. Cl. ................ 360/264.2; 360/245.8; 360/128
(58) Field of Search .............. 360/264.2, 266.3, 360/245.8, 245.9, 246, 128

(56) References Cited

U.S. PATENT DOCUMENTS 6,212,046 B1 * 4/2001 Albrecht et al. ......... 360/264.2

FOREIGN PATENT DOCUMENTS

JP 59-045675 3/1984

* cited by examiner

*Primary Examiner*—Craig A. Renner
(74) *Attorney, Agent, or Firm*—Greer, Burns & Crain, Ltd.

(57) ABSTRACT

The suspension for a head assembly is capable of securely limiting the small static electricity, which cannot be limited by improving a factory environment. In the suspension of the present invention, a gimbal section is provided to a front end of the suspension and capable of holding a slider. A terminal section is provided to a base end of the suspension and electrically connected to a magnetic disk drive unit. Terminals are formed in the terminal section and connected to a cable pattern, which will be connected to the slider. A short pattern is formed in an edge part of the terminal section, and one end of the short pattern is connected to a first terminal of the terminals. The edge part of the terminal section is bent so as to elastically make the other end of the short pattern contact a second terminal of the terminals. A slit is formed in the terminal section, so that the second terminal is capable of leaving from the short pattern.

6 Claims, 3 Drawing Sheets

HEAD ASSEMBLY AND SUSPENSION HAVING A TERMINAL SECTION WITH A BEND FOR CONTACT

BACKGROUND OF THE INVENTION

The present invention relates to a suspension for a head assembly of a magnetic disk drive unit and a head assembly having the suspension.

A plan view of a magnetic disk drive unit is shown in FIG. 5. The magnetic disk drive unit 100 has a housing 102 in which a magnetic disk 104 and an actuator 106 for positioning a magnetic head are assembled. An arm 108 is actuated by the actuator 106. A suspension 110 is provided to a front end of the arm 108. There is provided a slider 112, which has the magnetic head in a bottom face facing the magnetic disk 104, at a front end of the suspension 110. A head assembly comprises: the arm 108; the suspension 110 fixed to the arm 108; and the slider 112 mounted on the suspension 110.

In FIG. 6, the suspension 110 is fixed to the arm 108, and the slider 112 is mounted on the suspension 110. A gimbal section 114, on which the slider 112 is mounted, is formed at a front free end of the suspension 110. There are formed a plurality of terminals 116, which will be electrically connected to terminals of the slider 112, in the gimbal section 114. A cable pattern 118 is formed on a surface of the suspension 110 and insulated therefrom by an insulating layer. The cable pattern 118 electrically connects terminals 120, which are formed in a base end part of the suspension 110, to the terminals 116. The terminals 120 are formed in an outer face of a terminal section 111, which is formed into an L-shape by bending a part of a base member of the suspension 110. A flexible printed circuit is connected to the terminals 120, so that a control circuit of the magnetic disk drive unit can be electrically connected to the slider 112.

These days, in steps of assembling the head assembly, magnetic heads are apt to be damaged by static electricity. Recently, recording density of magnetic disks are higher, so magnetic heads must be smaller and structures of sliders must be complex. Therefore, the magnetic heads are apt to be easily damaged by the static electricity. Several years ago, resisting voltage of the magnetic heads against the static electricity were about 20–50 V; these days, the resisting voltage thereof is 5 V or less. In the conventional steps of assembling the head assembly, charging the static electricity was restricted by improving factory environment. However, it is impossible to limit the static electricity to 5 V or less by improving the factory environment.

SUMMARY OF THE INVENTION

An object of the present invention is to provide a suspension for a head assembly capable of securely limiting the small static electricity, which cannot be limited by improving the factory environment. Even if the resisting voltage of a magnetic head is about 5 V, damaging the magnetic head by the static electricity can be prevented by the suspension.

Another object of the present invention is to provide a suspension for a head assembly capable of easily assembling the head assembly and improving manufacturing yield.

Further object of the present invention is to provide a head assembly having the suspension.

To achieve the objects, the present invention has following structures.

Namely, a basic structure of the suspension of the present invention comprises: a gimbal section being provided to a front end of the suspension and capable of holding a slider; a terminal section being provided to a base end of the suspension and electrically connected to an electric circuit of a magnetic disk drive unit; a plurality of terminals being formed in the terminal section, the terminals being connected to a cable pattern, which will be connected to the slider; and a short pattern being formed in an edge part of the terminal section, one end of the short pattern being connected to a first terminal of the terminals, wherein the edge part of the terminal section is bent so as to elastically make the other end of the short pattern contact a second terminal of the terminals, and a slit is formed in the terminal section, whereby the second terminal is capable of leaving from the short pattern.

In the suspension, the short pattern, the cable pattern and the terminals may be made by etching an electrically conductive layer, which is formed on and electrically insulated from a base member of the suspension.

In the suspension, four terminals, which will be electrically connected to the slider, may be formed in the terminal section, two of the four terminals may be provided on an inner side, and the other two may be provided on an outer side, the short patterns for respectively connecting the inner terminals to the outer terminals may be formed in the terminal section, and the edge part of the terminal section may be bent so as to respectively connect the inner terminals to the outer terminals.

Another basic structure of the suspension of the present invention comprises: a gimbal section being provided to a front end of the suspension and capable of holding a slider; a terminal section being provided to a base end of the suspension and electrically connected to an electric circuit of a magnetic disk drive unit; a plurality of terminals being formed in the terminal section, the terminals being connected to a cable pattern, which will be connected to the slider; and a short pattern being formed in an edge part of the terminal section, one end of the short pattern being connected to a first terminal of the terminals, wherein a slit is formed in the terminal section, whereby the edge part of the terminal section can be bent and a second terminal of the terminals is capable of leaving from the short pattern.

The head assembly of the present invention comprises: the above described suspension; and a slider being held by the gimbal section of the suspension, wherein the cable pattern connects the terminals to the slider, and the cable pattern is formed on and electrically insulated from the base member of the suspension.

In the suspension and the head assembly of the present invention, the magnetic head, which is mounted on the suspension, can be securely protected from the static electricity. The head assembly can be easily assembled without damaging the magnetic head. Therefore, the magnetic head, whose resisting voltage is low and which cannot be treated in the conventional assembling step, can be easily treated, and the yield of manufacturing the head assembly can be improved.

Further, the countermeasure to the static electricity is executed while manufacturing the suspension, so an additional step for preparing the countermeasure to the static electricity is not required.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
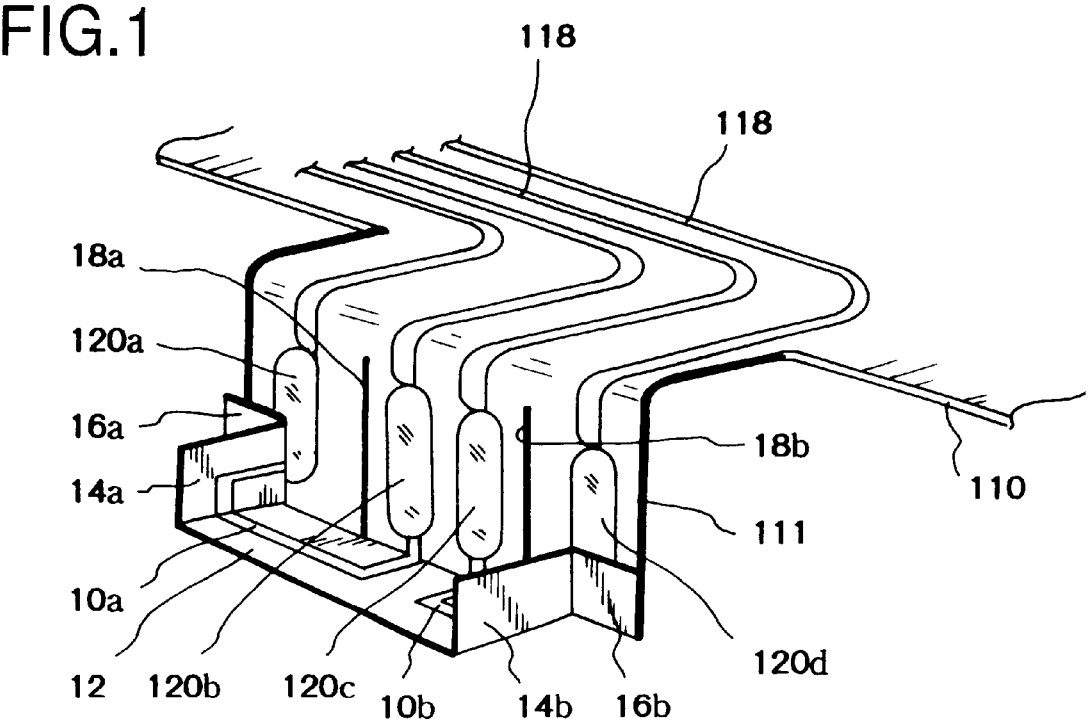
FIG. 1 is a partial perspective view of a suspension for a head assembly of an embodiment of the present invention, wherein a terminal section is shown.

FIG. 1 is a partial perspective view of a suspension of the present embodiment, wherein a terminal section, which has a unique constitution, is shown.

A terminal section 111, in which a plurality of terminals 120a–120d are provided, is extended from an edge of a base member of a suspension 110 and formed into an L-shape by bending the base member. The terminals 120a–120d are provided on an outer face of the terminal section 111. The four terminals 120a–120d are linearly arranged in the terminal section 111, and their surfaces are exposed. Cables of a cable pattern 118, which is formed on a surface of the suspension 110, are respectively connected to the terminals 120a–120d, so that the terminals 120a–120d are electrically connected to a slider 112 held on the suspension 110. The cable pattern 118, which has a predetermined pattern of the cables, and the terminals 120a–120d are formed by etching an electrically conductive layer, which is formed on and electrically insulated from the base member of the suspension 110.

Characteristic points of the present embodiment are: short patterns 10a and 10b, which electrically short the terminals 120a–120d in the terminal section 111; and an edge part of the terminal section 111 is bent so as to make the short patterns contact the terminals 120a–120d by elasticity of the base member of the suspension 110.

The short pattern 10a shorts the terminals 120a and 120b; the short pattern 10b shorts the terminals 120c and 120d. To avoid a damage of a magnetic head which is caused by the static electricity, a closed circuit is required, so all the terminals 120a–120d need not be electrically shorted simultaneously.

The short patterns 10a and 10b are formed in the terminal section 111, on which the terminals 120a–120d are formed, and provided to close to the edge part, which is bent.

In the present embodiment, the edge part of the terminal section 111 is bent, at the right angle, along a line A (see FIG. 2) extended in the longitudinal direction of the terminal section 111, so that an extended portion 12 is formed. Both end parts of the extended portion 12 are upwardly bend to form vertical portions 14a and 14b. Inner end parts of the vertical portions 14a and 14b are outwardly bent to form contact portions 16a and 16b, which face the surface of the terminal section 111. The contact portions 16a and 16b are elastically pressed onto the terminals 120a and 120d in the terminal section 111.

When the contact portions 16a and 16b elastically contact the terminals 120a and 120d, the short pattern 10a electrically shorts the terminals 120a and 120b and the short pattern 10b electrically shorts the terminals 120c and 120d. Conductive material of ends of the short patterns 10a and 10b, which respectively contact the terminals 120a and 120d, must be exposed.

As described above, the short pattern 10a electrically shorts the terminals 120a and 120b and the short pattern 10b electrically shorts the terminals 120c and 120d. Thus, in the present embodiment, one end of the short pattern 10a is electrically connected to the terminal 120b; the other end thereof is extended until reaching the contact portion 16a so as to elastically contact the terminal 120a. On the other hand, one end of the short pattern 10b is electrically connected to the terminal 120c; the other end thereof is extended until reaching the contact portion 16b so as to elastically contact the terminal 120d.

The short patterns 10a and 10b and the terminals 120a–120d can be formed simultaneously. They are formed by the steps of: forming a resin layer, which acts as an insulating layer, on the surface of the base member of the suspension 110; forming the electrically conductive layer on the resin insulating layer by spattering, etc.; and etching the conductive layer, so that the short patterns 10a and 10b and the terminals 120a–120d can be formed simultaneously. Since the one end of the short pattern 10a is connected to the terminal 120b, the terminals 120a and 120b are electrically shorted by elastically pressing the other end of the short pattern 10a onto the terminal 120a. Since the one end of the short pattern 10b is connected to the terminal 120c, the terminals 120c and 120d are electrically shorted by elastically pressing the other end of the short pattern 10b onto the terminal 120d. The contact portions 16a and 16b are respectively biased toward the terminals 120a and 120d by the elasticity of the base member of the suspension 110. With this structure, the terminals 120a and 120b and the terminals 120c and 120d are always electrically shorted by the contact portions 16a and 16b.

As shown in FIG. 1, there are formed slits 18a and 18b in the terminal section 111. By forming the slits 18a and 18b, the terminals 120a and 120d are capable of leaving from the contact portions 16a and 16b. When characteristics of the slider 112, which is mounted on the suspension 110, are examined or the head assembly is mounted onto a disk drive unit, the contact portions 16a and 16b are left from the terminals 120a and 120d so as not to electrically short the terminals 120a and 120b and the terminals 120c and 120d.

Figure 2:
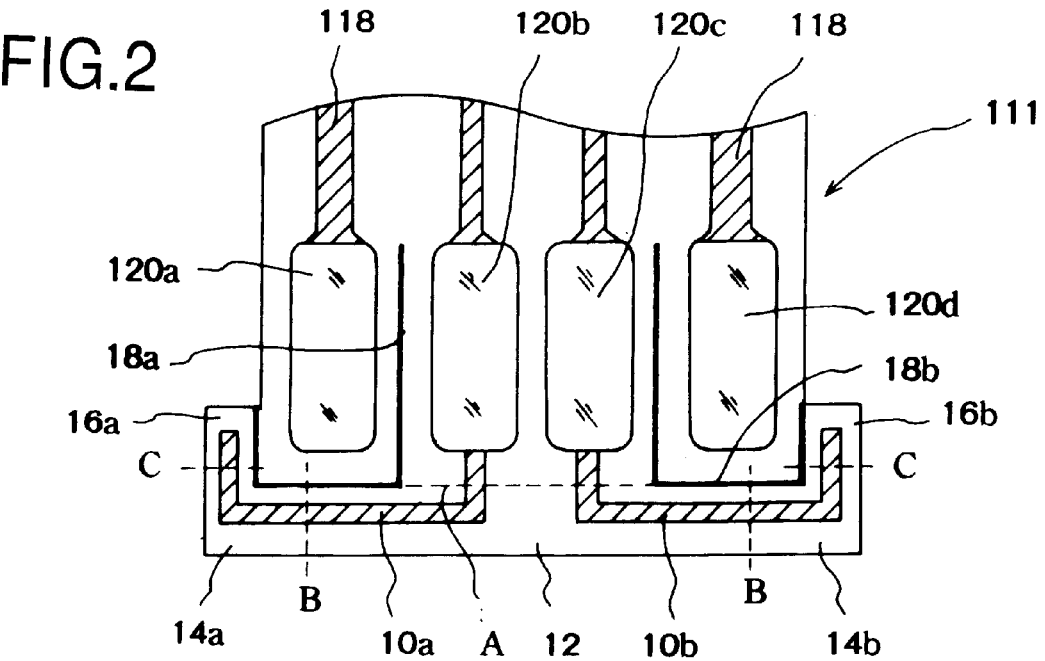
FIG. 2 is a plan view of the terminal section, which is not bent.

A plan view of the terminal section 111, which is not bent, is shown in FIG. 2. The terminals 120a–120d are linearly arranged with regular separations, and the cables of the cable pattern 118 are respectively connected thereto. The edge part of the terminal section 111 will be bent as described above, and the short patterns 10a and 10b are formed in the part. The one end of the short pattern 10a is connected to the terminal 120b, and the other end thereof is extended until reaching the contact portion 16a; the one end of the short pattern 10b is connected to the terminal 120c, and the other end thereof is extended until reaching the contact portion 16b.

In FIG. 2, the terminal section 111 is bent along the line A so as to form the extended portion 12. The extended portion 12 is formed by outwardly bending the terminal section 111, at the right angle, along the line A. The vertical portions 14a and 14b are formed by bending the terminal section 111 along lines B. The terminal section 111 is inwardly bent along the lines B, so that the vertical portions 14a and 14b are formed. The contact portions 16a and 16b are formed by bending the terminal section 111 along lines C. The terminal section 111 is outwardly bent along the lines C, so that the contact portions 16a and 16b are formed.

The contact portions 16a and 16b are elastically contact the terminals 120a and 120d respectively. Thus, to securely make the contact portions 16a and 16b contact the terminals 120a and 120d, the lines A, B and C must be correctly defined when the terminal section 111 is bent.

The slits 18a and 18b are designed to allow parts of the terminal section 111, in which the terminals 120a and 120d are respectively provided, to move. Further, the slits 18a and 18b allow the terminal section 111 to be bent, so that the vertical sections 14a and 14b and the contact portions 16a and 16b can be formed. In the present embodiment, the slits 18a and 18b are formed into L-shapes, but the shapes of the slits 18a and 18b are not limited to the L-shapes.

The suspension 110 is formed into a described shape. The terminal section 111 is simultaneously formed when the suspension 110 is formed. The slits 18a and 18b, etc. are also simultaneously formed when the suspension 110 is formed.

The terminal section 111 is bent after the suspension 110 is formed into the prescribed shape, so the terminal section 111, the extended portion 12, the vertical portions 14a and 14b and the contact portions 16a and 16b can be formed in a bending step, in which the terminal section 111 is formed.

Figure 3:
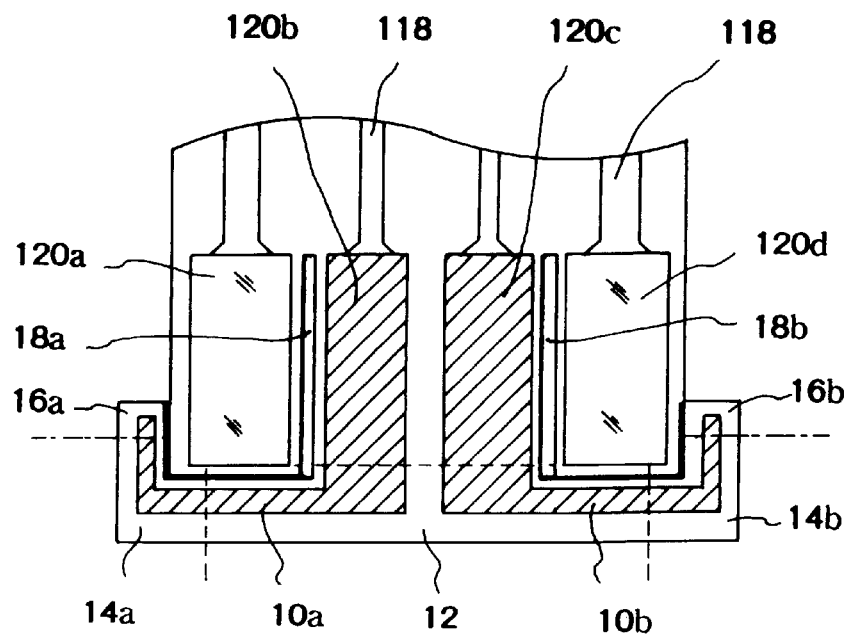
FIG. 3 is a plan view of another example of short patterns, etc. formed in the terminal section.

Another embodiment of the short patterns 10a and 10b, the slits 18a and 18b and the bent portions will be explained with reference to FIG. 3. The short patterns 10a and 10b are formed by respectively extending the terminals 120b and 120c. Width of the short patterns may be designed optionally. The slits 18a and 18b may be formed into narrow holes. Further, bending positions of the vertical portions 14a and 14b and the contact portions 16a and 16b are also designed optionally.

By forming the short patterns 10a and 10b in the terminal section 111, in which the terminals 120a–120d are formed, and bending the edge part of the terminal section 111, the terminals 120a and 120b and the terminals 120c and 120d are respectively shorted by the short patterns 10a and 10b. Therefore, the destruction of the slider 112, which is occurred when the slider 112 is mounted onto the suspension 110, can be effectively prevented.

In the conventional method of assembling a head assembly, the head slider 112 is apt to be damaged when the head assembly, on which the head slider 112 has been mounted, is assembled to a magnetic disk drive unit. After the head assembly is assembled to the disk drive unit, the slider 112 is connected to an electric circuit, so that no static electricity influences the slider 112. On the other hand, before the head assembly is assembled to the disk drive unit, the slider 112 is connected to no electric circuit, so that the static electricity badly influences the slider 112.

In the suspension 110 of the present embodiment, the slider 112 is mounted in the state, in which the terminals 120a and 120b and the terminals 120c and 120d are shorted, so that the destruction of the slider 112 by the static electricity can be securely prevented. Electrically shorting the terminals 120a–120d is the best way to securely avoid the destruction of the slider 112 by the static electricity. By employing the structure of the present embodiment, the sliders, whose resisting voltage is about 5 V and which cannot be treated by the conventional countermeasure, can be easily treated.

When the characteristics of the slider 112, which has been mounted on the suspension 110, are examined, the terminals 120a and 120d, which respectively contact the contact portions 16a and 16b, is pushed by proper means, e.g., a probe, so as to curve the terminal section 111 and leave the contact portions 16a and 16b from the terminals 120a and 120d. By leaving the contact portions 16a and 16b from the terminals 120a and 120d, all the terminals 120a–120d can be electrically separated and act like ordinary terminals. After the examination, the terminals 120a and 120d are returned to initial positions by the elasticity of the terminal section 111, so that the contact portions 16a and 16b contact the terminals 120a and 120d and the terminals 120a and 120b and the terminals 120c and 120d are electrically shorted.

In the suspension 110 of the present embodiment, the examination before assembling to the disk drive unit can be properly executed, and the bad influence of the static electricity can be securely prevented.

Figure 4:
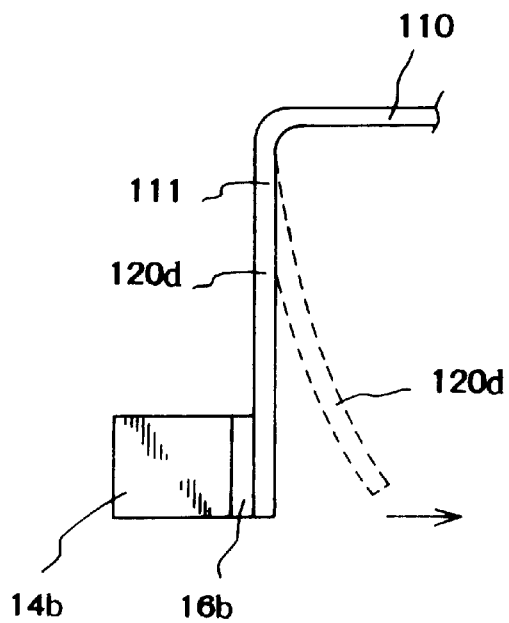
FIG. 4 is an explanation view of a contact portion and a terminal, which are separated.
Figure 5:
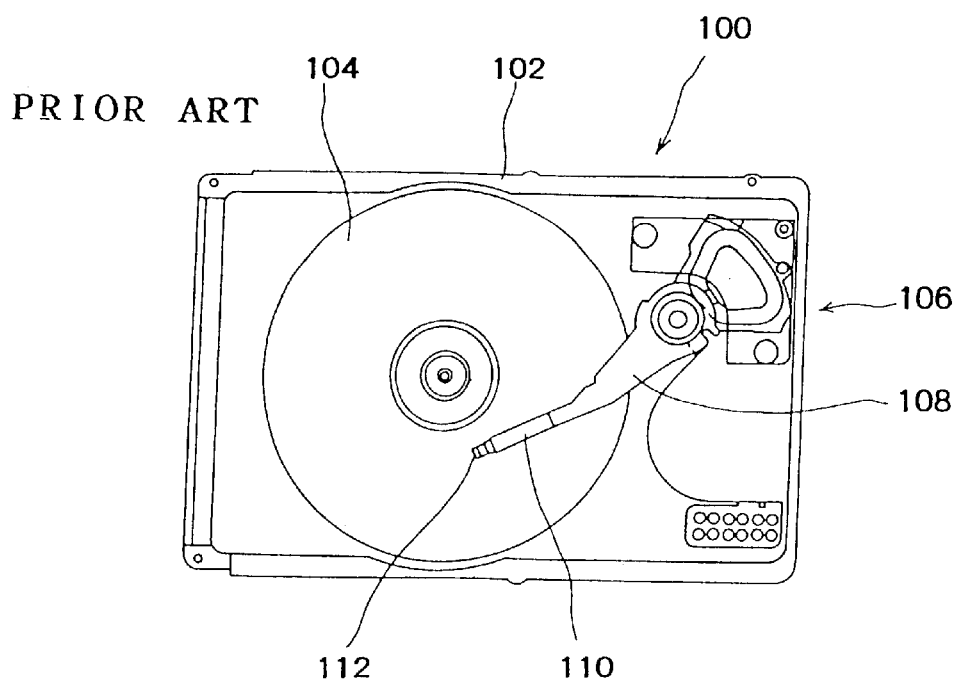
FIG. 5 is a plan view of the magnetic disk drive unit.
Figure 6:
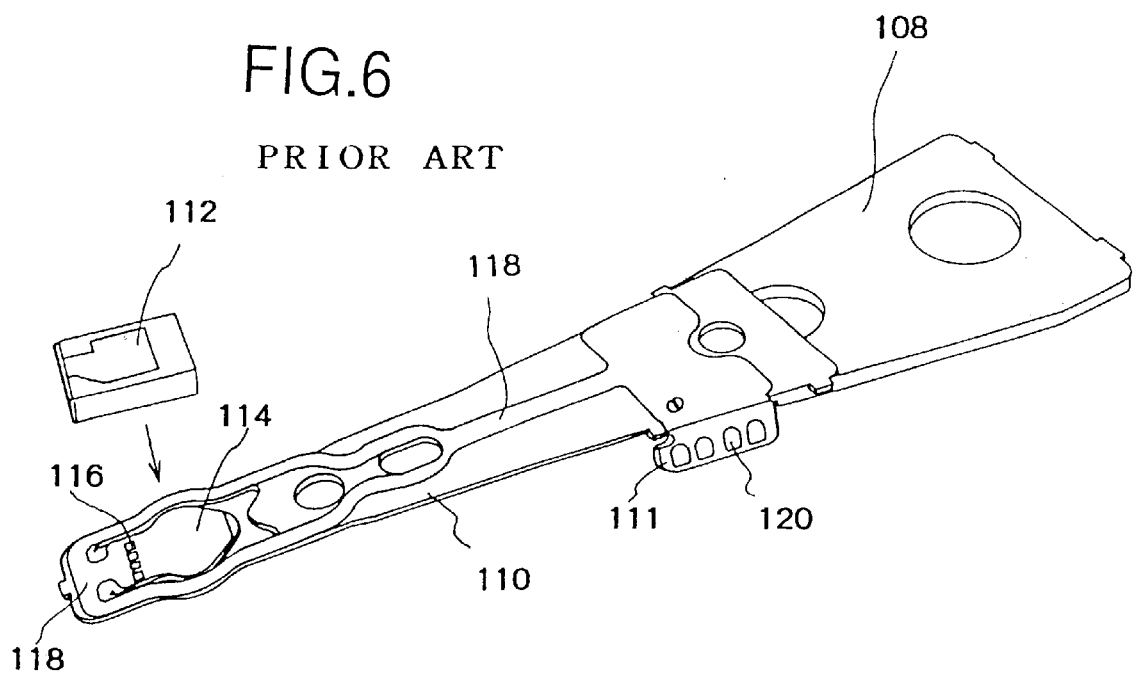
FIG. 6 is a perspective view of the arm to which the suspension is attached.

Note that, after the head assembly is assembled to the disk drive unit, the contact portions 16a and 16b must be left from the terminals 120a and 120d so as to electrically separate the terminals 120a–120d. Thus, the terminals 120a and 120d, which are contacted by the contact portions 16a and 16b, are bent, beyond an elastic limit, to move away from the contact portions 16a and 16b (see FIG. 4) so as to separate the terminals 120a and 120d from the contact portions 16a and 16b. By this treatment, the head assembly can be used in the disk drive unit as well as the conventional head assembly.

By employing the suspension 110 of the present embodiment, the bad influence of the static electricity to the magnetic head can be securely prevented, the magnetic heads whose resisting voltage are considerably low can be treated easily. By securely removing the bad influence, reliability of the products can be increased, so that the manufacturing yield can be improved. Since the cable pattern 118, the terminals 120a–120d and the short patterns 10a and 10b can be formed simultaneously, the countermeasure against the static electricity can be executed in the conventional manufacturing step without an additional step for the countermeasure against the static electricity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A suspension for a head assembly comprising:

a gimbal section being provided at a front end of said suspension and capable of holding a slider;

a terminal section being provided at a base end of said suspension and electrically connected to an electric circuit of a magnetic disk drive unit;

a plurality of terminals being formed in said terminal section, said terminals being connected to a cable pattern, which will be connected to the slider; and a short pattern being formed in an edge part of said terminal section, one end of said short pattern being connected to a first terminal of said terminals, wherein the edge part of said terminal section is bent so as to elastically make the other end of said short pattern contact a second terminal of said terminals, and a slit formed in said terminal section, whereby the second terminal is capable of being separated from said short pattern.

2. The suspension according to claim 1, wherein said short pattern, said cable pattern and said terminals are made by etching an electrically conductive layer, which is formed on and electrically insulated from a base member of said suspension.

3. The suspension according to claim 1, wherein four terminals of said plurality of terminals, which will be electrically connected to the slider, are formed in said terminal section, two of the four terminals are provided on an inner side, and the other two are provided on an outer side, said short pattern for respectively connecting said inner terminals to said outer terminals is formed in said terminal section, and the edge part of said terminal section is bent so as to respectively connect said inner terminals to said outer terminals.

4. A suspension for a head assembly comprising:

a gimbal section being provided at a front end of said suspension and capable of holding a slider;

a terminal section being provided at a base end of said suspension and electrically connected to an electric circuit of a magnetic disk drive unit;

a plurality of terminals being formed in said terminal section, said terminals being connected to a cable pattern, which will be connected to the slider; and a short pattern being formed in an edge part of said terminal section, one end of said short pattern being connected to a first terminal of said terminals, wherein a slit is formed in said terminal section, whereby the edge part of said terminal section can be bent and a second terminal of said terminals is capable of being separated from said short pattern.

5. A head assembly having a suspension comprising:

a gimbal section being provided at a front end of said suspension;

a slider being held by said gimbal section;

a terminal section being provided at a base end of said suspension and electrically connected to an electric circuit of a magnetic disk drive unit;

a plurality of terminals being formed in said terminal section;

a cable pattern connecting said terminals to said slider, said cable pattern being formed on and electrically insulated from a base member of said suspension; and a short pattern being formed in an edge part of said terminal section, one end of said short pattern being connected to a first terminal of said terminals, wherein the edge part of said terminal section is bent so as to elastically make the other end of said short pattern contact a second terminal of said terminals, and a slit is formed in said terminal section, whereby the second terminal is capable of being separated from said short pattern.

6. A head assembly having a suspension, comprising:

a gimbal section being provided at a front end of said suspension;

a slider being held by said gimbal section;

a terminal section being provided at a base end of said suspension and electrically connected to an electric circuit of a magnetic disk drive unit;

a plurality of terminals being formed in said terminal section;

a cable pattern connecting said terminals to said slider, said cable pattern being formed on and electrically insulated from a base member of said suspension; and a short pattern being formed in an edge part of said terminal section, one end of said short pattern being connected to a first terminal of said terminals, wherein a slit is formed in said terminal section, whereby the edge part of said terminal section can be bent and a second terminal of said terminals is capable of being separated from said short pattern.

* * * * *